(12) United States Patent
Raffaelli et al.

(10) Patent No.: US 10,843,761 B2
(45) Date of Patent: Nov. 24, 2020

(54) TILTING FORECARRIAGE OF A MOTOR VEHICLE AND A RELATED MOTOR VEHICLE

(71) Applicant: PIAGGIO & C. S.P.A., Pontedera (IT)

(72) Inventors: Andrea Raffaelli, Pontedera (IT);
Alberto Vianello, Pontedera (IT)

(73) Assignee: PIAGGIO & C.S.P. A., Pisa (IT)

( * ) Notice: Subject to any disclaimer, the term of this patent is extended or adjusted under 35 U.S.C. 154(b) by 101 days.

(21) Appl. No.: 16/315,795

(22) PCT Filed: Jun. 29, 2017

(86) PCT No.: PCT/IB2017/053923
§ 371 (c)(1),
(2) Date: Jan. 7, 2019

(87) PCT Pub. No.: WO2018/007911
PCT Pub. Date: Jan. 11, 2018

(65) Prior Publication Data
US 2019/0300095 A1    Oct. 3, 2019

(30) Foreign Application Priority Data

Jul. 8, 2016 (IT) .......................... 102016000071697

(51) Int. Cl.
*B62K 5/08* (2006.01)
*B62K 5/10* (2013.01)
(Continued)

(52) U.S. Cl.
CPC ................ *B62K 5/10* (2013.01); *B60G 11/10* (2013.01); *B62D 9/02* (2013.01); *B62K 5/027* (2013.01);
(Continued)

(58) Field of Classification Search
CPC ............... B62D 9/02; B62K 5/10; B62K 5/08
See application file for complete search history.

(56) References Cited

U.S. PATENT DOCUMENTS 4,550,926 A * 11/1985 MacIsaac ................. B60G 3/18
280/124.103
4,887,829 A * 12/1989 Prince .................... B60G 21/05
280/282
(Continued)

FOREIGN PATENT DOCUMENTS

| CN | 1721214 A | 1/2006 |
|----|-----------|--------|
| CN | 101175201 A | 4/2008 |

(Continued)

OTHER PUBLICATIONS

International Search Report for corresponding application PCT/IB2017/053923 filed on Jun. 29, 2017; dated Nov. 7, 2017.
(Continued)

*Primary Examiner* — Nicole T Verley
(74) *Attorney, Agent, or Firm* — Cantor Colburn LLP

(57) ABSTRACT

Motor vehicle forecarriage (8) comprising a forecarriage frame (16), a pair of front wheels (10', 10") kinematically connected to the forecarriage frame (16) by means of an articulated quadrilateral (20), said articulated quadrilateral (20) comprising a pair of cross members (24', 24"), hinged to the forecarriage frame (16) at middle hinges (28), said cross members (24', 24") being connected to each other at opposite transverse ends (40, 44), by means of uprights (48, 48', 48") pivoted to said transverse ends (40, 44) at side hinges (52), the cross members (24', 24") and the uprights (48), the tilting support structure (72) being hinged to the articulated quadrilateral (20) by means of steering hinges (76) a guide wheel (88) connected to the rotation pin (68) of front wheel (10', 10") at a special wheel attachment (94), a support bracket (92) hinged to the articulated quadrilateral
(Continued)

(20) by means of said steering hinges (76), the guide wheel (88) being in turn hinged to the support bracket (92) at opposite upper and lower axial ends (96, 98).

27 Claims, 9 Drawing Sheets

(51) Int. Cl.
B62K 5/027 (2013.01)
B62K 5/05 (2013.01)
B62K 5/06 (2006.01)
B62D 9/02 (2006.01)
B60G 11/10 (2006.01)

(52) U.S. Cl.
CPC ............... B62K 5/05 (2013.01); B62K 5/06 (2013.01); B62K 5/08 (2013.01); B60G 2200/44 (2013.01); B60G 2202/117 (2013.01); B60G 2300/122 (2013.01); B60G 2300/45 (2013.01); B62K 2202/00 (2013.01)

(56) References Cited

U.S. PATENT DOCUMENTS

| | | | | |
|---|---|---|---|---|
| 5,762,351 A * | 6/1998 | SooHoo | ............... | B60G 21/007 |
| | | | | 180/210 |
| 7,377,522 B2 * | 5/2008 | MacIsaac | ............... | B60G 3/01 |
| | | | | 280/5.506 |
| 7,467,802 B2 * | 12/2008 | Peng | ............... | B60G 21/007 |
| | | | | 280/124.103 |
| 7,487,985 B1 * | 2/2009 | Mighell | ............... | B62K 5/027 |
| | | | | 180/210 |
| 7,568,541 B2 * | 8/2009 | Pfeil | ............... | B60G 21/007 |
| | | | | 180/210 |
| 7,571,787 B2 * | 8/2009 | Saiki | ............... | B60Q 1/124 |
| | | | | 180/210 |
| 7,850,180 B2 * | 12/2010 | Wilcox | ............... | B62D 9/02 |
| | | | | 280/124.103 |
| 8,123,240 B2 * | 2/2012 | Mercier | ............... | B62K 5/10 |
| | | | | 280/124.103 |
| 8,419,027 B2 * | 4/2013 | Ting | ............... | B62K 5/027 |
| | | | | 280/93.511 |
| 8,814,186 B1 * | 8/2014 | Rinda | ............... | B62K 5/06 |
| | | | | 280/93.504 |
| 8,818,700 B2 * | 8/2014 | Moulene | ............... | G05D 1/0891 |
| | | | | 701/124 |
| 9,037,347 B2 * | 5/2015 | Hayashi | ............... | B62K 5/10 |
| | | | | 701/37 |
| 9,216,790 B2 * | 12/2015 | Takano | ............... | B62K 5/10 |
| 9,296,420 B2 * | 3/2016 | Sasaki | ............... | B62D 25/16 |
| 9,340,249 B2 * | 5/2016 | Takano | ............... | B62K 21/00 |
| 9,387,902 B2 * | 7/2016 | Kroening, Jr. | ............... | B62K 5/08 |
| 9,527,543 B2 * | 12/2016 | Mercier | ............... | B62K 5/10 |
| 9,545,967 B2 * | 1/2017 | Takano | ............... | B62K 21/00 |
| 9,586,642 B2 * | 3/2017 | Mori | ............... | B60G 7/04 |
| 9,688,339 B2 * | 6/2017 | Hirayama | ............... | B62K 5/08 |
| 9,725,130 B2 * | 8/2017 | Takano | ............... | B62K 21/02 |
| 9,776,680 B2 * | 10/2017 | Hirakawa | ............... | B62K 11/02 |
| 9,855,807 B2 * | 1/2018 | Mori | ............... | B60G 3/26 |
| 9,981,708 B2 * | 5/2018 | Ohno | ............... | B62K 5/027 |
| 2004/0140645 A1 * | 7/2004 | Hayashi | ............... | B62K 5/08 |
| | | | | 280/282 |
| 2006/0151232 A1 * | 7/2006 | Marcacci | ............... | B62K 5/05 |
| | | | | 180/414 |
| 2007/0029751 A1 * | 2/2007 | Marcacci | ............... | B62K 5/08 |
| | | | | 280/124.1 |
| 2007/0126199 A1 | 6/2007 | Peng | | |
| 2011/0006498 A1 | 1/2011 | Mercier | | |
| 2011/0275256 A1 * | 11/2011 | Gibbs | ............... | B60F 3/003 |
| | | | | 440/12.51 |
| 2012/0181768 A1 * | 7/2012 | MacIsaac | ............... | B60G 13/16 |
| | | | | 280/124.103 |
| 2015/0197304 A1 * | 7/2015 | Kroening, Jr. | ............... | B62K 13/04 |
| | | | | 180/209 |
| 2018/0222527 A1 * | 8/2018 | Raffaelli | ............... | B62K 5/08 |
| 2018/0237094 A1 * | 8/2018 | Fischer | ............... | B62K 5/06 |
| 2018/0265156 A1 * | 9/2018 | Hara | ............... | G05D 3/125 |
| 2018/0327044 A1 * | 11/2018 | Raffaelli | ............... | B62D 9/02 |

FOREIGN PATENT DOCUMENTS

| | | | | |
|---|---|---|---|---|
| CN | 201670311 U | 12/2010 | | |
| CN | 104487331 A | 4/2015 | | |
| EP | 2982588 A1 | 2/2016 | | |
| EP | 3144164 A1 * | 3/2017 | ............. | B62K 5/027 |
| JP | 2016175438 A * | 10/2016 | ............. | B62D 9/02 |
| WO | 2009061158 A2 | 5/2009 | | |

OTHER PUBLICATIONS

Written Opinion for corresponding application PCT/IB2017/053923 filed on Jun. 29, 2017; dated Nov. 7, 2017.

* cited by examiner

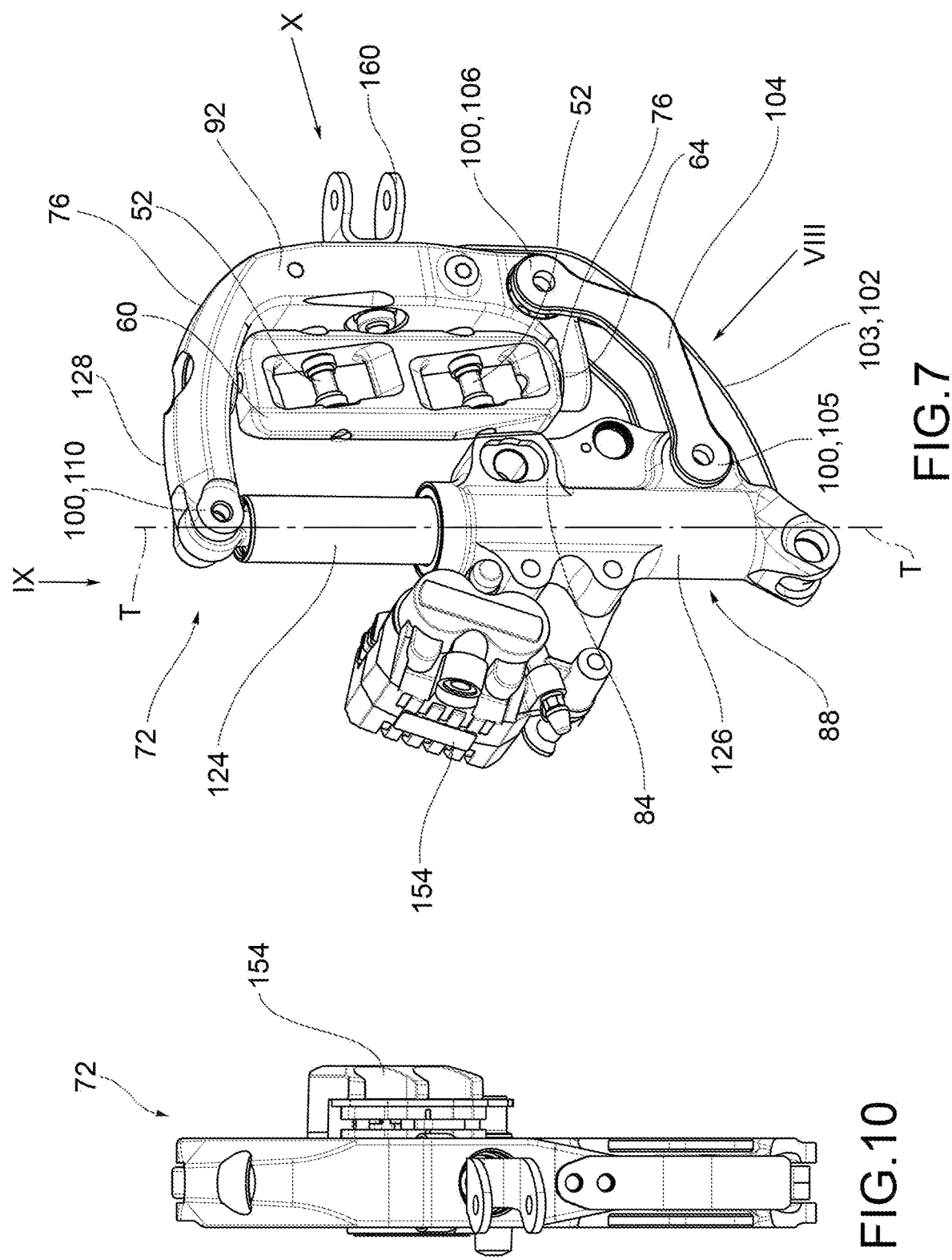

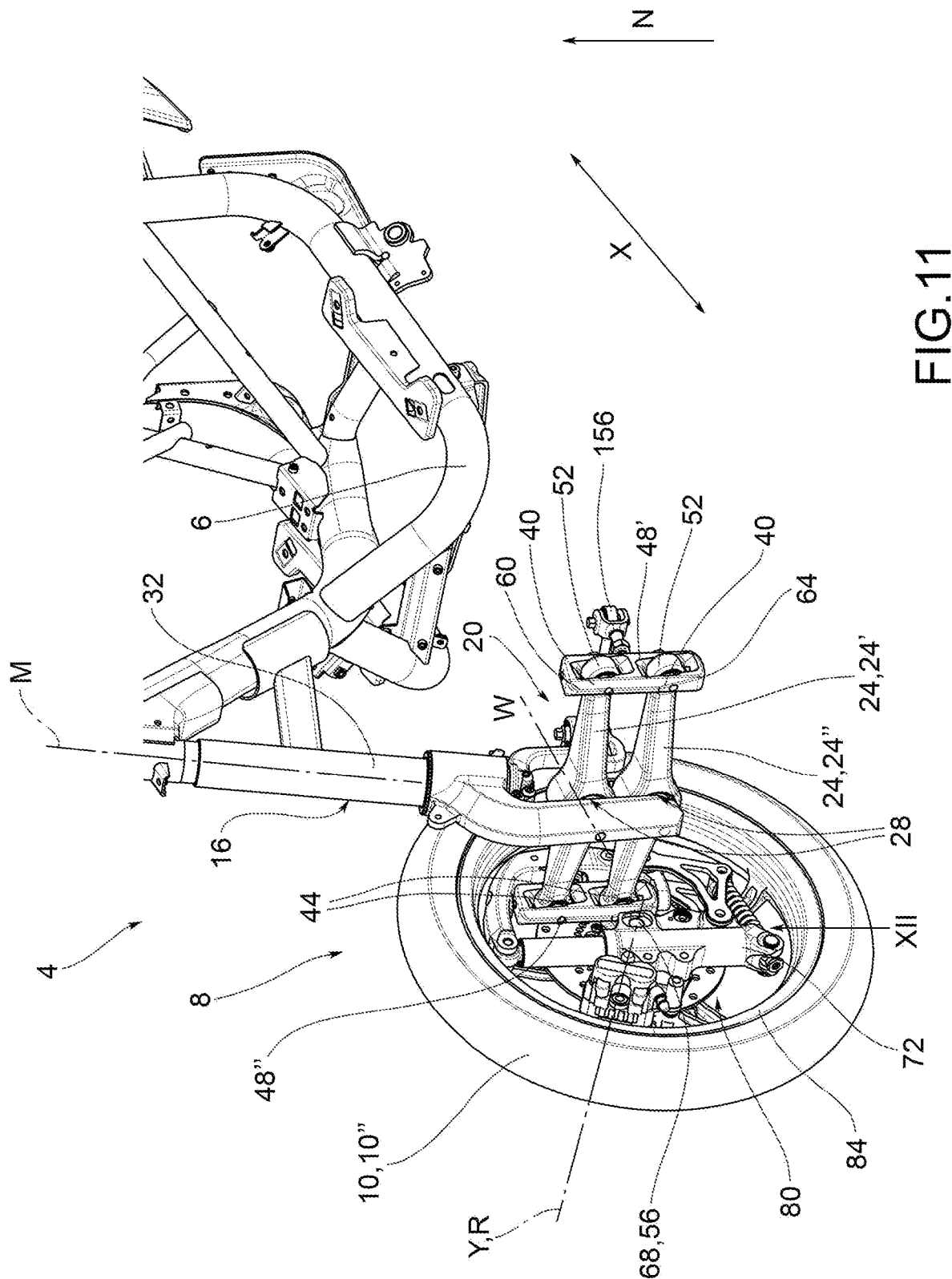

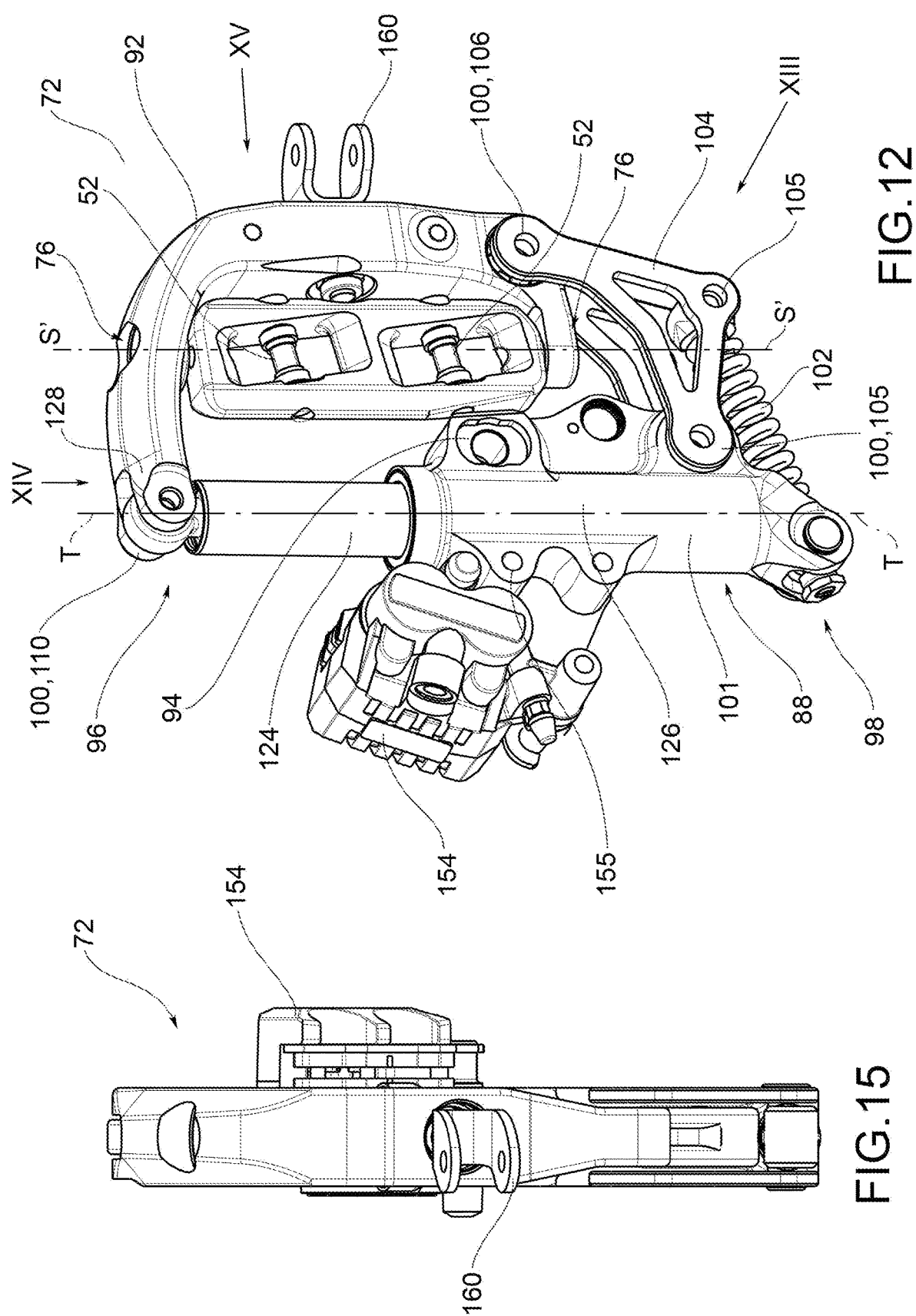

TILTING FORECARRIAGE OF A MOTOR VEHICLE AND A RELATED MOTOR VEHICLE

SCOPE

The present invention concerns a tilting forecarriage of a motor vehicle and a related tilting motor vehicle.

STATE OF THE ART

As is well known, there are in the art three-wheeled vehicles with a rear drive wheel and two steering and tilting, i.e. rolling or leaning, front wheels.

The rear wheel is therefore intended to provide the driving torque and therefore to allow traction, while the paired front wheels have the purpose of providing the directionality of the vehicle.

The use of two front wheels, instead of two rear wheels, avoids the use of a differential for the transmission of the torque. This results in a reduction in costs and weight on the rear axle.

The paired wheels on the forecarriage, in addition to steering, can tilt and roll: in this way, unlike three-wheeled vehicles with two wheels at the rear, vehicles with two wheels on the forecarriage are similar to a real motorcycle give that, Just like a motorcycle, the vehicle is able to lean into a curve.

With respect to a motor vehicle with only two wheels, such vehicles with two paired wheels on the forecarriage have greater stability provided by the double support on the ground of the front wheels, similar to that provided by a car.

The front wheels are kinematically connected to each other by means of kinematic systems which ensure that the same will roll and/or steer synchronously and symmetrically, for example, via the interposition of articulated quadrilaterals.

With regard to the steering angle of the front wheels, it is also possible to provide different steering angles between the front wheels, for example, if an automobile-type steering wheel is used, with the outer wheel remaining more open in the curve.

Tilting three-wheeled motor vehicles are therefore designed to provide the user with the maneuverability of a two-wheeled motorcycle and, at the same time, the stability and safety of a four-wheeled vehicle.

In fact, the two predetermined objectives are antithetical, given that greater stability implies the presence of additional elements with respect to a two-wheeled motor vehicle (such as, for example, the third wheel and its kinematic systems), which inevitably add weight to the vehicle's structure.

Moreover, the presence of 'only' three wheels cannot necessarily guarantee the stability and road-holding ability of a four-wheeled vehicle.

Therefore, it is essential to develop a three-wheeled vehicle that can withstand these antithetical targets while at the same time ensuring stability and ease of handling, as well as reliability and low costs.

To achieve these objects, a specific geometry of the front portion of the frame, or forecarriage, must be developed to support the front wheels in their steering and rolling or tilting movement.

PRESENTATION OF THE INVENTION

To solve the aforementioned problems, a number of three-wheeled vehicle solutions have been adopted in the art, two of which are at the forecarriage.

Such solutions known in the art fail to optimize the need for stability and maneuverability described above.

The need is therefore perceived to resolve the drawbacks and limitations cited with reference to the known art.

This requirement is satisfied by a motor vehicle forecarriage according to claim 1 and a motor vehicle according to claim 26.

DESCRIPTION OF THE FIGURES

Further features and advantages of the present invention will become more understandable from the following description of its preferred and non-limiting embodiments, wherein:

FIG. 5 is a side view of the detail of FIG. 2, from the side of the arrow V of FIG. 2;

FIG. 7 is a perspective view of the detail VII of a forecarriage of the motor vehicle of FIG. 6;

FIG. 10 is a side view of the detail of FIG. 7, from the side of the arrow X of FIG. 7;

FIG. 11 is a partial perspective view of a motor vehicle according to a further embodiment of the present invention;

FIG. 12 is a perspective view of the detail XII of a forecarriage of the motor vehicle of FIG. 11;

FIG. 15 is a side view of the detail of FIG. 12, from the side of the arrow XV of FIG. 12.

Figure 1:
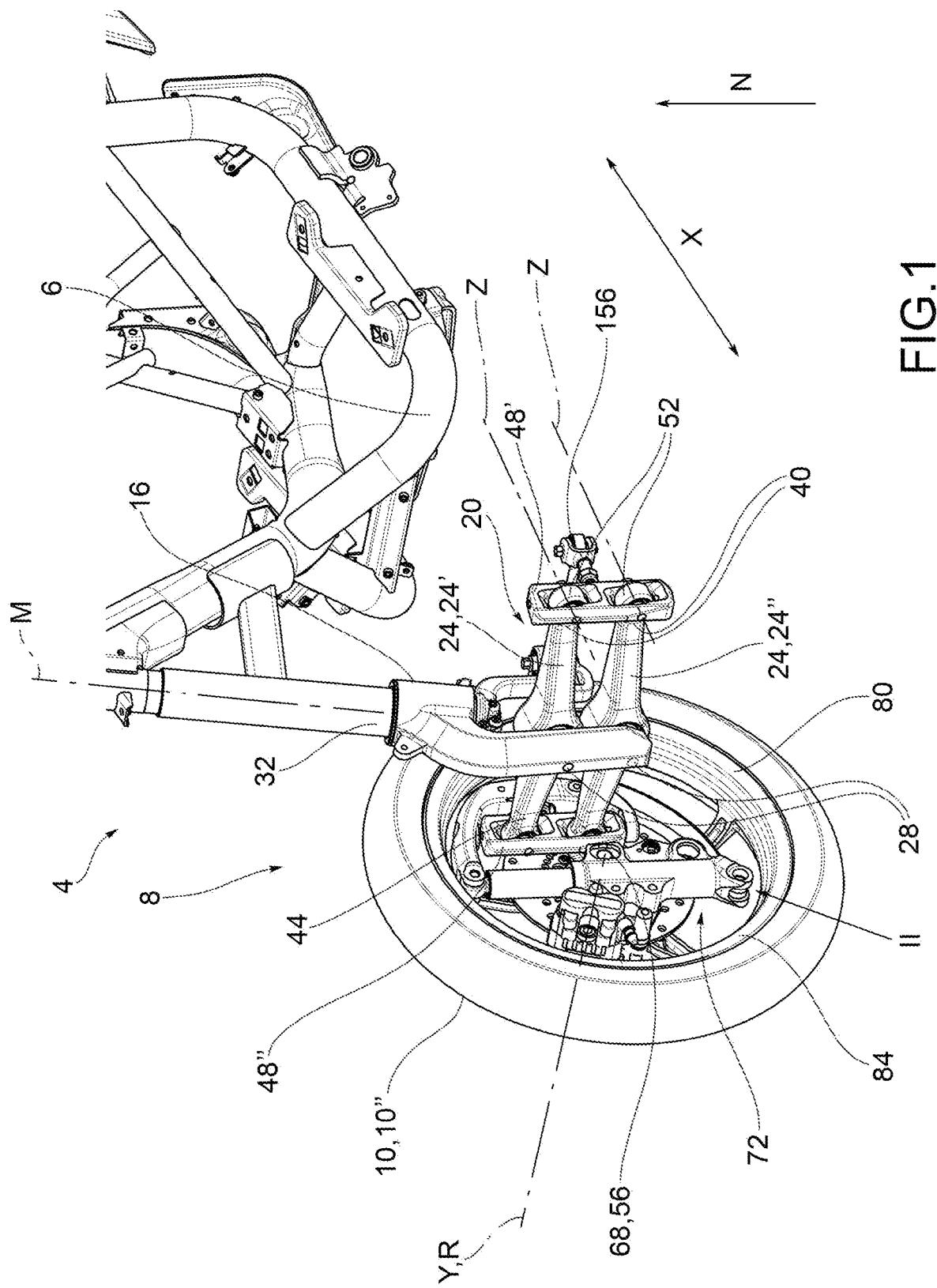
FIG. 1 is a partial perspective view of a motor vehicle according to an embodiment of the present invention.
Figure 2:
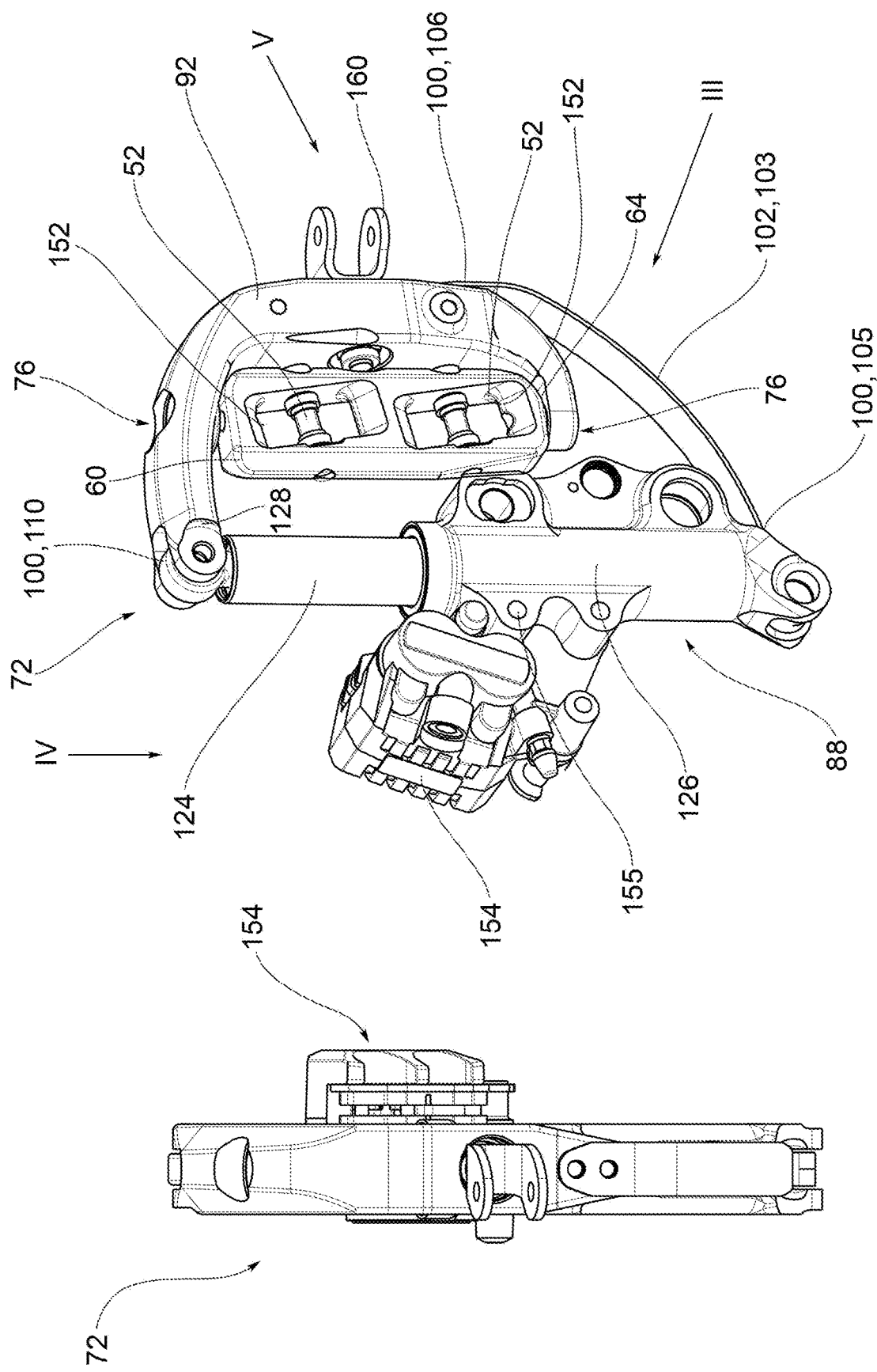
FIG. 2 is a perspective view of the detail II of a forecarriage of the motor vehicle of FIG. 1.
Figure 3:
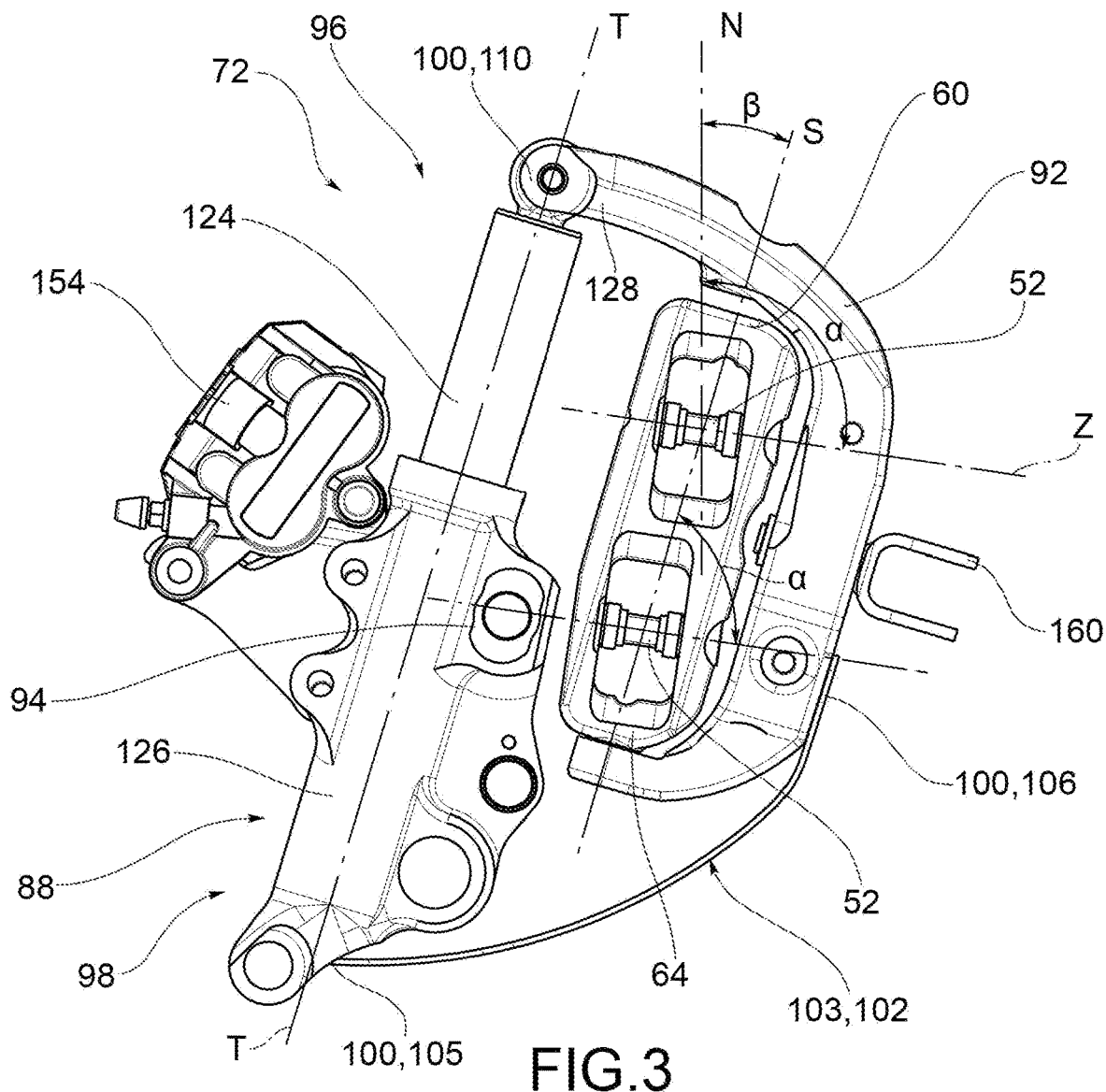
FIG. 3 is a side view of the detail of FIG. 2, from the side of the arrow III of FIG. 2.
Figure 4:
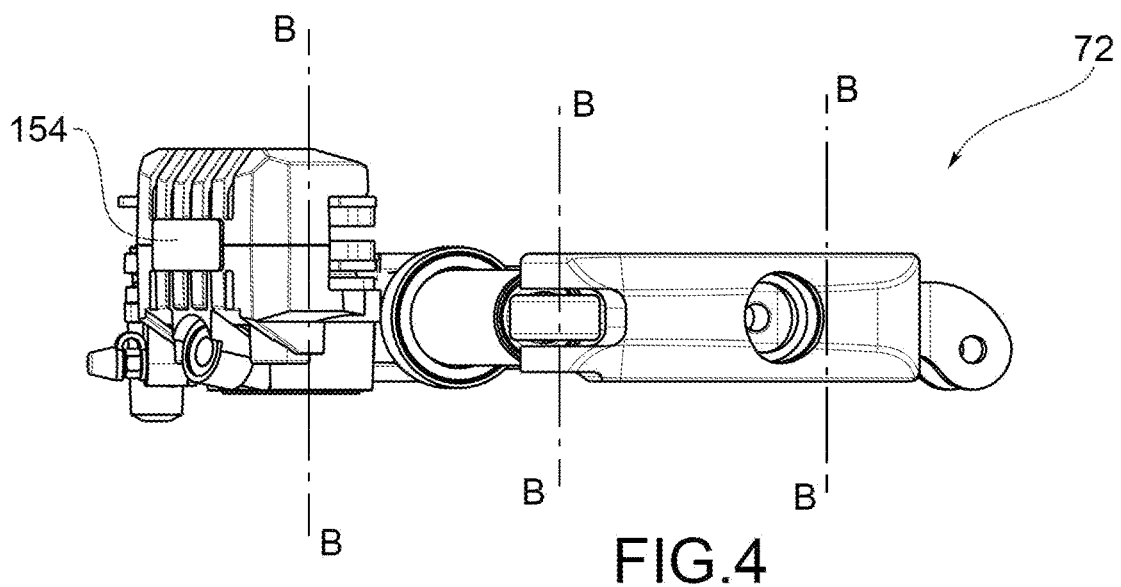
FIG. 4 is a plan view of the detail of FIG. 2, from the side of the arrow IV of FIG. 2.
Figure 6:
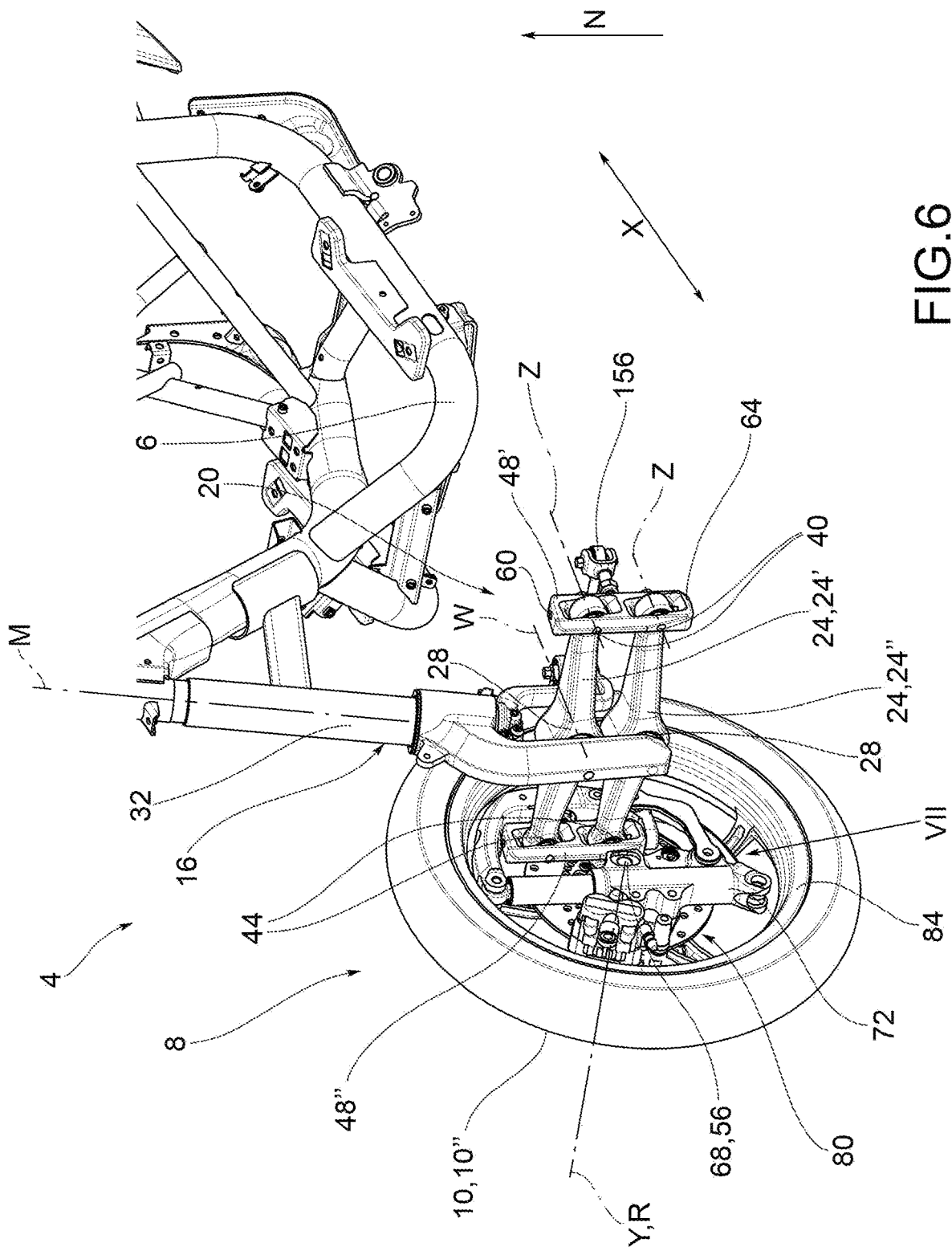
FIG. 6 is a partial perspective view of a motor vehicle according to a further embodiment of the present invention.
Figure 8:
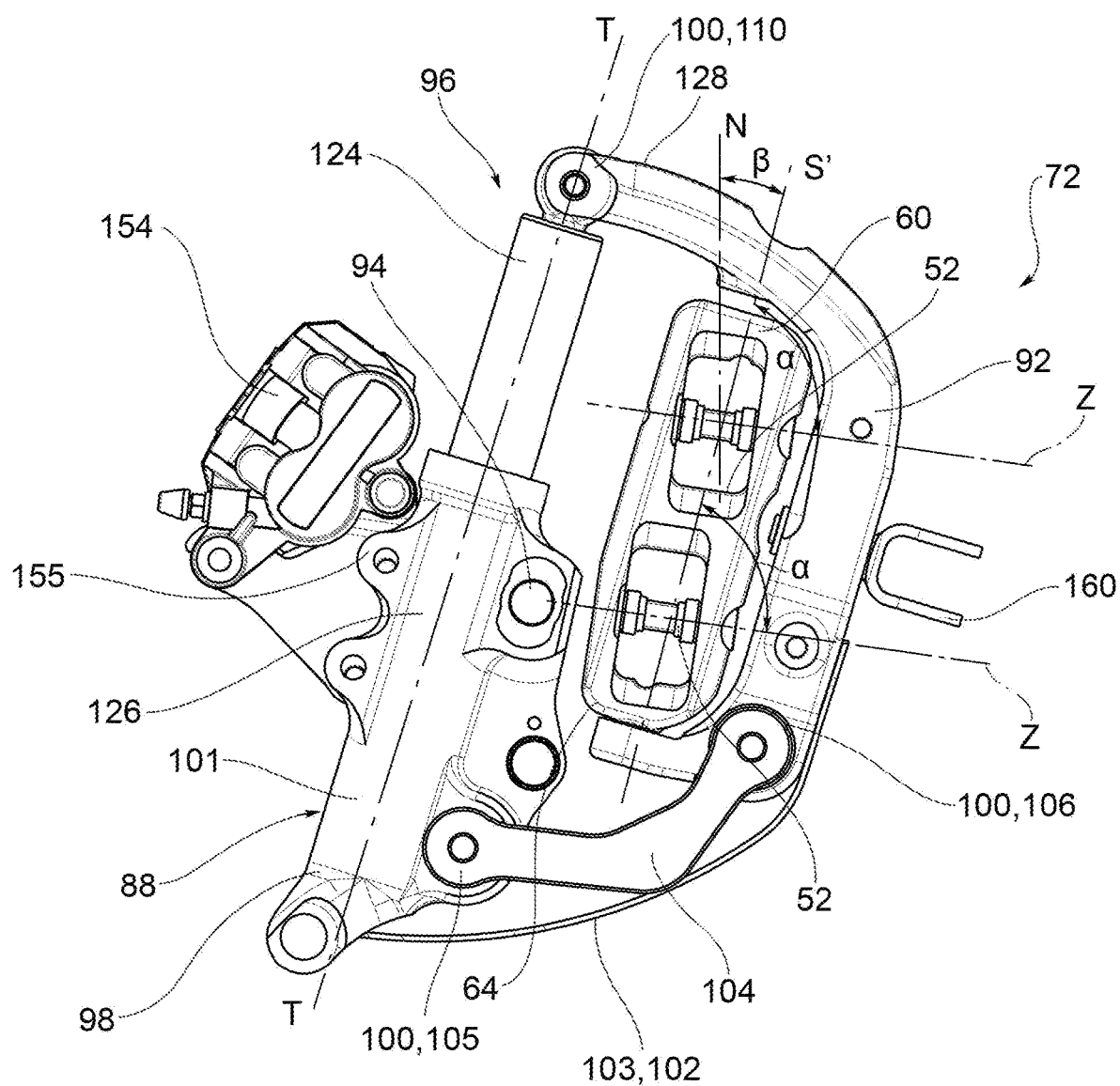
FIG. 8 is a side view of the detail of FIG. 7, from the side of the arrow VIII of FIG. 7.
Figure 9:
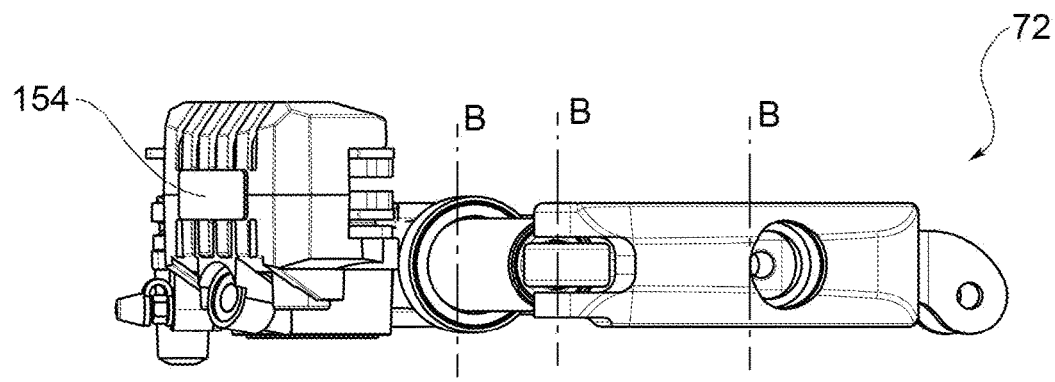
FIG. 9 is a plan view of the detail of FIG. 7, from the side of the arrow IX of FIG. 7.
Figure 13:
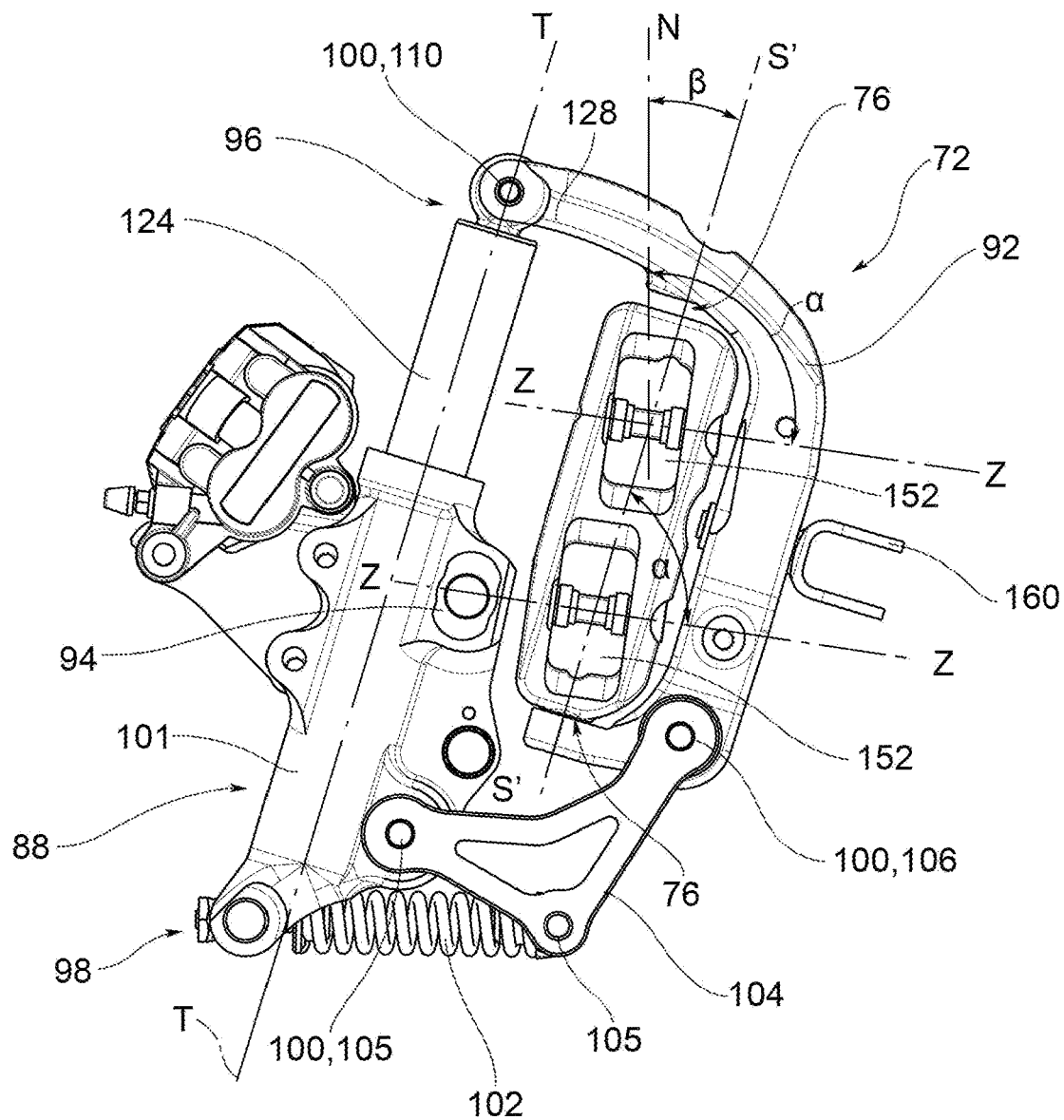
FIG. 13 is a side view of the detail of FIG. 12, from the side of the arrow XIII of FIG. 12.
Figure 14:
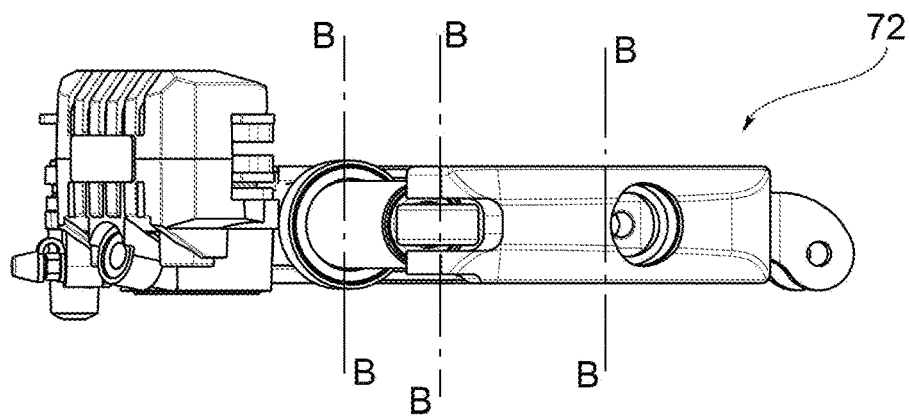
FIG. 14 is a plan view of the detail of FIG. 12, from the side of the arrow XIV of FIG. 12.

The elements or parts of elements in common between the embodiments described hereinafter will be indicated with the same numerical references.

DETAILED DESCRIPTION

With reference to the aforementioned figures, a total schematic view of a motor vehicle according to the present invention is collectively indicated at 4.

For the purposes of the present invention, it should be noted that the term 'motor vehicle' is to be considered in the broad sense, including any motorcycle having at least three wheels, i.e., two front wheels, as better described below, and at least one rear wheel. Thus, so-called quadricycles are also included in the definition of a motor vehicle, having two wheels on the forecarriage and two wheels on the rear axle.

The motor vehicle 4 comprises a frame 6 extending from a forecarriage 8 which supports at least two front wheels 10,10',10" to a rear axle supporting one or more rear wheels (not shown).

It is possible to distinguish a left front wheel 10' and a right front wheel 10" wherein the definition of the left and right wheel 10',10" is purely conventional and is intended with respect to a driver of the vehicle. Said wheels are, therefore, arranged to the left and to the right of a centerline plane M-M of the motor vehicle, relative to the observation point of a driver of the same.

In the following description, and also in the figures, reference will be made to specular or symmetrical elements of the forecarriage relative to said centerline plane M-M, using the marks ' and " to indicate respectively the left and right components respectively of the forecarriage, with respect to a driver's observation point when driving the same.

For the purposes of the present invention, the frame 6 of the motor vehicle may be of any shape and size and may, for example, be of the trellis-type, box-type, single- or double-cradle, and so on.

The frame 6 of the motor vehicle may be in one piece or in several parts; for example, the frame 6 of the motor vehicle interconnects with a rear axle frame which may comprise a rear swingarm (not shown) that supports one or more of the rear drive wheels.

Said swingarm may be connected to the frame 6 by direct hinging, or by interposing intermediate levers and/or frames.

The forecarriage of the motor vehicle 8 comprises a forecarriage frame 16 and a pair of front wheels 10 kinematically connected to the forecarriage frame 16 by an articulated quadrilateral 20.

The articulated quadrilateral 20 comprises a pair of cross members 24, hinged to the forecarriage frame 16 at the middle hinges 28.

The concept of an articulated quadrilateral must be considered in the broad sense; in other words, a structure with at least four sides suitable to allow the tilting movement of the forecarriage and therefore of the entire vehicle. The term 'articulated quadrilateral' is also intended to mean a structure having a greater number of sides and/or parts kinematically equivalent to an articulated quadrilateral. In addition, the present invention also covers an forecarriage solution comprising two or more articulated quadrilaterals suitable for producing the said tilting kinematics.

The middle hinges 28 define middle hinge axes W-W parallel to each other.

For example, said middle hinges 28 engage with a front beam 32, which straddles a centerline plane MM passing through a longitudinal direction X-X or the driving direction of the motor vehicle.

For example, a steering mechanism, connected to a handlebar (not shown) of the motor vehicle 4, is pivoted on a steering column rotatably inserted in a sleeve of frame 6 of the motor vehicle 4, in a known manner.

The cross members 24 extend along a predominantly transverse direction Y-Y between opposing transverse ends 40,44.

In particular, the cross members 24 are connected to each other at said opposing transverse ends 40,44 by means of uprights 48 pivoted to said transverse ends 40,44 at the side hinges 52.

In one embodiment, the cross members 24,24',24" are mounted cantilevered with respect to the front beam 32.

The cross members 24 and the uprights 48 define said articulated quadrilateral 20. In particular, the quadrilateral 20 comprises two cross members 24, i.e. a top cross member 24' and a lower cross member 24", wherein the upper cross member 24' faces the part of the associable handlebar and the lower cross member 24" faces the ground supporting the motor vehicle 4.

The cross members 24', 24" are not necessarily equal to each other in shape, material and size; each cross member 24 may be made in one piece or in two or more mechanically associated parts, e.g. by welding, bolts, rivets and the like.

The uprights 48 are two, in particular a left upright 48' and a right upright 48".

The definition of the left and right upright 48', 48" is purely conventional and refers to a driver of a vehicle. Said left and right uprights 48',48" are arranged to the left and to the right of a centerline plane M-M of the motor vehicle, relative to the observation point of a driver of the same.

The side hinges 52 are parallel to each other and define the respective axes of the side hinges Z-Z.

Preferably, said middle 28 and side 52 hinges are oriented according to middle W-W and side Z-Z hinge axes parallel to each other.

The left and right uprights 48',48" support rotatably the left and right front wheels 10',10" respectively, around respective steering axes S'-S',S"-S". Said steering axes S'-S', S"-S" are parallel to each other.

Each upright 48 extends from an upper end 60 to a lower end 64.

The upper end 60 is directed toward the upper cross member 24' and the lower end 64 directed toward the lower cross member 24". Each front wheel comprises a stub axle 56 of a front wheel 10.

According to one embodiment, each stub axle 56 is mechanically connected to a rotation pin 68 of a front wheel 10 so as to rotatably support the front wheel 10 around a related rotation axis R-R.

Preferably, each rotation pin 68 of the front wheel 10 is between the upper end 60 and the lower end 64 of the corresponding upright 48 of the articulated quadrilateral 20.

According to one possible embodiment, the hinges 28 and 52 are parallel to each other and also orthogonal to said steering axes S'-S',S"-S". In other words, according to one embodiment, with respect to a projection plane P passing through said middle hinges 28, the steering axes S'-S',S"-S" identify, with the middle W-W and side Z-Z hinge axes, an angle α of 90 degrees.

According to possible embodiments, said angle α is between 80 and 120 degrees, and, preferably, said angle α is between 90 and 110 degrees; even more preferably said angle α is 100 degrees.

The steering axes SY-S',S",S", relative to said projection plane P, may be inclined at a steering angle β between 4 and 20 degrees and more preferably between 8 and 16 degrees relative to a vertical direction N-N, perpendicular to the ground.

According to further embodiments, it is also possible to provide that the hinges 28 and 52 are inclined according to middle W-W and side Z-Z hinge axes parallel to the ground, i.e. perpendicular to said vertical direction N-N relative to said projection plane P: in such configuration said angle β is 0 degrees.

Also, as seen, it is possible to provide that the hinges 28 and 52 are not perpendicular to the steering axes S'-S',S"-S": in fact, as described above, said angle α, identified between the steering axes S'-S',S"-S" and the middle W-W and side Z-Z hinge axes relative to a projection plane P passing through said middle hinges 28, may be between 80 and 120 degrees.

The parallelism to the ground of the middle W-W and side Z-Z hinge axes causes, in the rolling motion, the inner wheel with respect to the curve to rise up almost vertically with the double advantage of making the rolling motion of the wheel decoupled from the horizontal braking forces (transmitted by the ground) and of occupying less space toward the motor vehicle hull.

It should be noted that by tilting the middle W-W and side Z-Z hinge axes with respect to the S'-S',S"-S" steering axes, so that, in static states of rest, said middle and side hinge axes W-W, Z-Z are not parallel to the ground, it is obtained that in braking conditions, and therefore compression of the suspensions of the front wheels 10',10" described below, the same middle and side hinge axes W-W, Z-Z are inclined, assuming substantial parallelism with the ground. For example, it occurs that, in static states, the middle and side hinge axes W-W, Z-Z define a non-zero angle β with the horizontal direction (which coincides with the angle formed with the vertical direction, which is normal in the horizontal direction); in braking conditions and in maximum compression such angle tends to be canceled.

When, in braking, the middle W-W and side Z-Z hinge axes being substantially parallel to the ground, wheel slip is avoided, given that the braking forces, horizontal and therefore parallel to the ground, do not give components along the excursive movement of the wheels, which ends up virtually orthogonal to the ground, that is, vertical.

It should be noted that the upper 60 and lower 64 ends of the uprights 48',48" are placed above and below the rotation pin 68 of the respective front wheels 10',10" and not completely above it, as is the case in the solutions of the known art.

In other words, each rotation pin 68 of the front wheel 10',10" is between the upper end 60 and the lower end 64 of the corresponding upright 48 of the articulated quadrilateral 20.

This implies that the stiffness of the connection between each wheel 10',10" and the articulated quadrilateral, comprising the suspension, is an order of magnitude stiffer than the aforementioned solutions of the prior art, helping to make more remote the possibility that an alternate resonance of the wheels 10',10" may occur due to braking forces or an asymmetrical impact. Therefore, the present invention generally contributes to providing a vehicle that is light but also safe and precise, and transmits to the driver a sense of safety in the forecarriage, as it does not cause the user to feel vibrations or shaking in the handlebar.

Moreover, the positioning of the upper and lower cross members 24', 24" of the articulated quadrilateral near the vertical clearance of the wheels allows the center of gravity of the front axle, and therefore the vehicle, to be moved downwards, improving the dynamic behavior of the vehicle.

Advantageously, the forecarriage 8 comprises, at each front wheel 10',10", a tilting support structure 72 for a stub axle 56 of each front wheel 10',10" mechanically connected to a rotation pin 68 of each front wheel 10',10" so as to rotatably support the front wheel 10',10" around a respective rotation axis R-R, R'-R', R"-R".

Advantageously, said tilting support structure 72 being hinged to the articulated quadrilateral 20 by means of steering hinges 76 arranged at the upper ends 60 and lower ends 64 of each upright 48',48", said steering hinges defining respective steering axes S'-S', S"-S" of the wheels 10',10" parallel to each other.

Preferably, the steering axes S'-S',S",S" coincide with the axes of symmetry of said uprights 48', 48", respectively.

Each wheel 10',10" comprises a centerline plane of the wheel R'-R', R" R", wherein said centerline plane of the wheel R'-R",R",R' preferably passes through the steering axis S'-S',S",S" of each front wheel 10',10". In a further embodiment, there is provided a transverse offset or cantilever between each steering axis S'-S',S"S" and the related centerline plane of the wheel R'-R', R"-R". Such transverse cantilever is between 0 and 2 cm, more preferably between 0 and 1 cm, and even more preferably said transverse cantilever is 0.7 cm.

Preferably, said tilting support structure 72 is entirely contained within a volume 80 delimited by a rim 84 of each wheel 10',10".

Preferably, said volume 80 faces a centerline plane M-M of the forecarriage 8 passing through said middle hinges 28. In other words, the stub axles 56 are turned inward i.e. toward the centerline plane M-M of the motor vehicle, and the related components associated with the stub axle 56 are not directly visible to an external observer.

According to a preferred embodiment, said tilting support structure 72 comprises a guide wheel 88 connected to said stub axle 56 of the front wheel 10',10" and a support bracket 92 hinged to the articulated quadrilateral 20 by means of said steering hinges 76.

The guide wheel 88 is connected to the rotation pin and rotatably supports said rotation pin 68 of the corresponding wheel 10',10" at a specific wheel attachment 94.

The guide wheel 88 extends between opposite upper and lower axial ends 96,98; preferably, at said opposite axial ends 96,98, the guide wheel 88 is mechanically connected to connecting elements on the frame.

For example, the guide wheel 88 is in turn hinged to the support bracket 92 at opposite upper and lower axial ends 96,98 of the guide wheel 88 by means of at least two tilting hinges 100 that define respective tilting axes B-B and that realize a roto-translational connection between the guide wheel 88 and the support bracket 92. According to a possible embodiment, the guide wheel 88 and the support bracket 92, as a whole, are mutually connected by means of three tilting hinges 100 that define respective tilting axes B-B, as better explained in the following.

Preferably, the guide wheel 88, the support bracket and the tilting hinges 100 delimit a perimetrically closed tilting support structure 72.

'Perimetrically closed structure' is intended to mean that the projections of the guide wheel 88 of the support bracket 92 and the tilting hinges 100 on the centerline plane of the wheel R'-R',R",R" define a closed polyline, i.e. having a closed perimeter.

Preferably, the rotation pin 68 of each wheel 10',10" is positioned inside said perimetrically closed tilting support structure 72, and/or the side hinges 52 and the respective upright 48 are positioned inside said perimetrically closed tilting support structure 72.

Advantageously, the tilting support structure 72 comprises a damper element 101 and/or an elastic element 102 to control the tilting movement, wherein the elastic element 102 connects the guide wheel 88 and the support bracket 92 to each other.

According to one embodiment, the elastic element 102 is mounted cantilevered between the support bracket 92 and an axial end 96,98 of the guide wheel 88.

According to one possible embodiment, said elastic element 102 is a leaf spring 103 respectively associated to the guide wheel 88 and the support bracket 92 at a first and a second tilting hinge 105,106.

For example, said first and second tilting hinges 105,106 may be elastic deformation hinges.

In other words, it is possible to fasten at least one end of the leaf spring 103 so that, due to the elasticity of the spring, this may flex elastically to form an elastic hinge.

According to one possible embodiment, the tilting support structure 72 comprises a connecting rod 104 doubly hinged to the support bracket 92 and to the guide wheel 88 at a first and a second tilting hinge 105,106.

According to one possible embodiment, the elastic element 102 is mounted cantilevered between the guide wheel 88 and an anchor 105 on the connecting rod 104.

For example, said elastic element 102 is a coil spring. Said coil spring may be a steady or variable pitch spring so as to suitably vary the elastic force as a function of the displacement kinematics of the tilting support structure 72, and in particular depending on the rotation of the connecting rod 104.

According to a further possible embodiment, the elastic element 102 is connected cantilevered between the guide wheel 88 and the support bracket 92, parallel to the connecting rod 104.

For example, said elastic element 102 is a leaf spring 103.

The guide wheel 88 is a straight guide comprising the damper element 101. This straight guide wheel 88 defines an agitation axis T-T for each wheel 10',10".

According to one embodiment, the guide wheel 88 comprises a stem 124 which houses the damper element 101 and a case 126, coaxially fitted flush with the stem 124 and translatable with respect to the stem 124, the case 126 supporting the stub axle 56 of the corresponding wheel 10',10" and being elastically affected by the spring 120.

According to one possible embodiment, the tilting support structure 72 comprises an end 128 hinged to the support bracket 92 and to the guide wheel 88 at a third tilting hinge 110. The first, the second and the third tilting hinge 105, 106,110, as a whole, define respective hinge axes B-B and realize a roto-translational connection between the guide wheel 88 and the support bracket 92.

According to one embodiment, the tilting hinges 100,105, 106,110 are hinged to the support bracket 92 and to the guide wheel 88 at the tilting axes B-B perpendicular to a centerline plane R'-R', R"-R" of each wheel 10',10".

According to one embodiment, the tilting hinges 100,105, 106,110 are hinged to the support bracket 92 and the guide wheel 88 at the tilting axes B-B perpendicular to the steering axes S'-S', S"-S" defined by said steering hinges 76.

Preferably, the transverse ends 40,44 of the upper and lower cross members 24',24" of the articulated quadrilateral 20 are at least partially housed inside transverse seats 152 formed within said uprights 48', 48".

Preferably, each guide wheel 88 is fitted with braking means 154 of the corresponding wheel 10',10".

For example, said braking means 154 may comprise a disc brake caliper. For the purposes of the present invention, braking means 154 may be of any type; preferably, said braking means 154 are positioned and sized so as to enter within the volume 80 delimited by the rim 84 of each wheel 10',10".

Preferably said guide wheel 88 comprises special eyelets 155 to allow the braking means 154 to be attached to the guide wheel 88.

Preferably, said support bracket 92 is connected to steering tie-rods 156 kinematically connected to an associable handlebar of the motor vehicle. For example, steering tie-rods 156 may be connected to each support bracket 92 by interposing hinges or spherical joints 160.

As mentioned above, the motor vehicle 4 according to the present invention comprises at least one rear drive wheel; according to one possible embodiment, the motor vehicle comprises two rear drive wheels on the rear axle.

For example, in the embodiment wherein the motor vehicle is a quadricycle, the rear drive wheels on the rear axle are connected to each other and to a rear axle frame by means of an articulated quadrilateral 20 as described above with respect to the front wheels 10',10".

According to a possible embodiment, the motor vehicle forecarriage 8 comprises a forecarriage frame 16, a pair of front wheels 10', 10" kinematically connected to the forecarriage frame 16 by means of an articulated quadrilateral 20, said articulated quadrilateral 20 comprising a pair of cross members 24', 24", hinged to the forecarriage frame 16 at middle hinges 28, said cross members 24', 24" being connected to each other, at opposite transverse ends 40, 44, by means of uprights 48, 48', 48" pivoted to said transverse ends 40, 44 at side hinges 52, each upright 48', 48" extending from an upper end 60 to a lower end 64, the upper end 60 being turned towards the upper cross member 24' and the lower end 64 being turned towards the lower cross member 24", the cross members 24', 24" and the uprights 48 defining the articulated quadrilateral 20, characterized in that the forecarriage 8 comprises, at each front wheel 10', 10", a tilting support structure 72 for a stub axle 56 of each front wheel 10', 10" mechanically connected to a rotation pin 68 of a front wheel 10', 10" so as to rotatably support the front wheel 10', 10" around a related rotation axis R'-R', R"-R", the tilting support structure 72 being hinged to the articulated quadrilateral 20 by means of steering hinges 76 arranged at the upper ends 60 and lower ends 64 of each upright 48', 48", said steering hinges defining respective steering axes S'-S', S"-S" of the wheels 10', 10" parallel to each other, wherein the tilting support structure 72 comprises a guide wheel 88 connected to the rotation pin 68 of front wheel 10', 10" at a special wheel attachment 94, a support bracket 92 hinged to the articulated quadrilateral 20 by means of said steering hinges 76, the guide wheel 88 being in turn hinged to the support bracket 92 at opposite upper and lower axial ends 96, 98, by means of at least three tilting hinges 100, 105, 106, 110 that define respective tilting axes B-B and that form a roto-translational connection between the guide wheel 88 and the support bracket 92, wherein the tilting support structure 72 comprises a damper element 101 and/or an elastic element 102 to control the tilting movement, wherein the elastic element 102 connects the guide wheel 88 and the support bracket 92 to each other.

As may be appreciated from the foregoing, the present invention overcomes the disadvantages of the prior art.

Advantageously, the present invention enhances the dynamic behavior of the vehicle with respect to the solutions of the known art.

In fact, the particular arrangement and architecture of the front wheel support allows to significantly move back the center of instantaneous rotation of the front wheels relative to the longitudinal direction.

In this way, better control of suspension dive is obtained, comparable to that obtainable by the use of a traditional-type fork with telescopic stems. In other words, the suspension dive is uniform and progressive, and the forecarriage of the motor vehicle transmits to the driver a feeling of stability and confidence.

Moreover, the tilting-type mounting of the support structure of the front wheels prevents the same suspension, comprising a spring and shock absorber housed in the guide wheel, from being stressed to flexure: in this way, the relative sliding between the stem and the case of the suspension is facilitated and jamming phenomena are avoided.

It is possible, therefore, to avoid oversizing the suspension to overcome such flexure and jamming of the suspension given that, due to the tilting, the suspension may accommodate the shaking movement of the wheel with respect to the frame by tilting without flexing and therefore without jamming.

This effect is even more evident in the case of braking because the significant forces in play do not tend to flex the suspension, which may tilt, extending and compressing freely, so as to duplicate the roughness of the asphalt and transmit to the driver a feeling of safety and confidence in the forecarriage.

A smaller and lighter suspension may be used given that it need not withstand flexural loads.

The reduction of the dimensions of the components of the suspension also results in a reduction in the mass of the forecarriage and hence a better handling of the tilting vehicle and better propensity to lean.

Also, as seen, the steering axis of the wheels is considerably moved back in the longitudinal direction with respect to the rotation pin of the same.

In this way, a smaller clearance of the back part of the wheels toward the centerline plane of the vehicle during steering is obtained. In this way, with the same steering angle of the wheels, it is possible to use a relatively narrower wheel track, or transverse distance between the front wheels, without the respective rear portions of the front wheels interfering with the frame of the vehicle's forecarriage.

Consequently, it is possible to use smaller wheel track to reduce the overall transverse dimensions of the vehicle. The use of smaller front wheel track contributes to the achievement of an agile vehicle with a good propensity to lean or tilt.

In addition, it is possible to position the steering linkage in the position moved back with respect to the forecarriage and therefore protected. Moreover, said steering linkage may also be concealed to an external observer because it is arranged in a rearward and hidden position.

Furthermore, due to moving back the steering axis and the related steering mechanisms/leverages longitudinally, it is possible to move the mass of the forecarriage back longitudinally so as to contribute to the so-called centering of the mass in order to improve the dynamics of the vehicle both in curves and in acceleration/braking.

In addition, it is to be noted that the suspended mass of the forecarriage according to the invention are reduced in order to improve the ability of the forecarriage to duplicate the roughness of the road.

Moreover, it is to be noted that the support structure of the front wheels is extremely rigid in both the longitudinal and transverse directions.

In fact, in the transverse direction, there is provided an articulated quadrilateral structure that is very robust and allows the wheels to lean or tilt at the same angle.

In the longitudinal direction, it should be noted that an extremely rigid tilting structure is used, given that it provides a bracket which, on the one hand, is bound to the guide wheel by appropriate tilting means, and on the other, is in turn bound to the rigid structure of said transverse quadrilateral. In this way, longitudinal forces, due to the tilting of the structure, are discharged onto the rigid structure of the bracket and, via the latter, onto the articulated quadrilateral.

In addition, the forecarriage structure of the present invention is particularly compact so that, advantageously all the kinematic systems of support, suspension and steering of each wheel are contained within the space occupied by the rim of the same wheel. In this way, in addition to obvious aesthetic advantages, dynamic advantages are also obtained, given that there is a reduced aerodynamic resistance due to said components being shielded within each wheel.

The solution described falls into the case of interconnected suspensions, given that the balance to a load on a front wheel is found with an equal load on the paired front wheel; the transfer of the load takes place through the quadrilateral and therefore through its inertia, which also involves the whole vehicle and thus has a lag of a magnitude linked to the inertia itself.

In practice, the inertia interposed between the paired wheels acts to bring the solution of interconnected wheels nearer to one of independent wheels to encourage comfort and to counter any resonance phenomena that might be triggered on the wheels, which otherwise would not be dampened.

Thus, the motor vehicle in accordance with the present invention is able to guarantee not only a high stability, higher than that of a two-wheeled motor vehicle due to the presence of two paired front wheels, but also a remarkable ease of handling and leaning, typical of a two-wheeled motorcycle.

Furthermore, as described above, the upper and lower ends of the uprights of the articulated quadrilateral are placed above and below the rotation pin of the respective front wheels and not completely above it, as is the case in the solutions of the known art. This implies that the stiffness of the connection between each wheel and the articulated quadrilateral, comprising the suspension, is an order of magnitude stiffer than the aforementioned solutions of the prior art, helping to make more remote the possibility that an alternate resonance of the front wheels may occur due to braking forces or an asymmetrical impact. Therefore, the present invention generally contributes to providing a vehicle that is light but also safe and precise, and transmits to the driver a sense of safety in the forecarriage, as it does not cause the user to feel vibrations or shaking in the handlebar.

A person skilled in the art, in the object of satisfying contingent and specific requirements, may make numerous modifications and variations to the solutions described above, all of which are within the scope of the invention as defined by the following claims.

The invention claimed is:

1. Motor vehicle forecarriage comprising
   a forecarriage frame,
   a pair of front wheels kinematically connected to the forecarriage frame by means of an articulated quadrilateral,
   said articulated quadrilateral comprising a pair of cross members, hinged to the forecarriage frame at middle hinges,
   said cross members being connected to each other, at opposite transverse ends, by means of uprights pivoted to said transverse ends at side hinges, each upright extending from an upper end to a lower end, the upper end being turned towards the upper cross member and the lower end being turned towards the lower cross member,
   the cross members and the uprights defining the articulated quadrilateral,
   wherein
   the forecarriage comprises, at each front wheel, a tilting support structure mechanically connected to a rotation pin of each front wheel so as to rotatably support the front wheel around a related rotation axis, the tilting support structure being hinged to the articulated quadrilateral by means of steering hinges arranged at the upper ends and lower ends of each upright, said steering hinges defining respective steering axes of the wheels parallel to each other,
wherein
the tilting support structure comprises
a guide wheel connected to the rotation pin of each front wheel at a special wheel attachment,
a support bracket hinged to the articulated quadrilateral by means of said steering hinges,
the guide wheel being in turn hinged to the support bracket at opposite upper and lower axial ends, by means of two tilting hinges that define respective tilting axes and that form a roto-translational connection between the guide wheel and the support bracket,
wherein the tilting support structure comprises
a damper element and/or an elastic element to control the tilting movement, wherein the elastic element connects the guide wheel and the support bracket to each other.

2. Motor vehicle forecarriage according to claim 1, wherein the elastic element is mounted cantilevered between the support bracket and an axial end of the guide wheel.

3. Motor vehicle forecarriage according to claim 1, wherein said elastic element is a leaf spring respectively associated to the guide wheel and the support bracket at a first and a second tilting hinge.

4. Motor vehicle forecarriage according to claim 3, wherein said first and second tilting hinge are elastic deformation hinges.

5. Motor vehicle forecarriage according to claim 1, wherein the tilting support structure comprises a connecting rod doubly hinged to the support bracket and the guide wheel at a first and a second tilting hinge.

6. Motor vehicle forecarriage according to claim 5, wherein the elastic element is mounted cantilevered between the guide wheel and an anchorage of said connecting rod.

7. Motor vehicle forecarriage according to claim 5, wherein said elastic element is a coil spring.

8. Motor vehicle forecarriage according to claim 5, wherein the elastic element is connected cantilevered between the guide wheel and the support bracket, parallel with respect to the connecting rod.

9. Motor vehicle forecarriage according to claim 8, wherein said elastic element is a leaf spring.

10. Motor vehicle forecarriage according to claim 1, wherein said guide wheel is a rectilinear guide which comprises the damper element.

11. Motor vehicle forecarriage according to claim 1, wherein the guide wheel comprises a stem, which houses the damper element, and a case, fitted coaxially to the stem, and translatable with respect to the stem, the case supporting the wheel stub axle, the damper element being placed between the case and the stem.

12. Motor vehicle forecarriage according to claim 1, wherein the guide wheel, the support bracket and the tilting hinges delimit a perimetrically closed tilting support structure.

13. Motor vehicle forecarriage according to claim 12, wherein the rotation pin of each wheel is positioned inside said perimetrically closed tilting support structure, and/or the side hinges and the respective upright are positioned inside said perimetrically closed tilting support structure.

14. Motor vehicle forecarriage according to claim 1, wherein the tilting support structure comprises an end hinged to the support bracket and to the guide wheel at a third tilting hinge.

15. Motor vehicle forecarriage (8) according to claim 1, wherein said tilting hinges are hinged to the support bracket and the guide wheel at the tilting axes perpendicular to a centerline plane of each wheel.

16. Motor vehicle forecarriage according to claim 1, wherein said tilting hinges are hinged to the support bracket and the guide wheel at the tilting axes perpendicular to the steering axes defined by said steering hinges.

17. Motor vehicle forecarriage according to claim 1, wherein said tilting support structure is entirely contained within a volume delimited by a rim of each wheel, wherein said volume is facing with respect to a centerline plane of the forecarriage passing through said middle hinges.

18. Motor vehicle forecarriage according to claim 1, wherein the transverse ends of the upper and lower cross members are partially housed in transverse seats formed in said uprights.

19. Motor vehicle forecarriage according to claim 1, wherein to each guide wheel are fixed braking means of the corresponding wheel.

20. Motor vehicle forecarriage according to claim 1, wherein to said support brackets are connected steering tie-rods kinematically connected to an associable handlebar of the motor vehicle.

21. Motor vehicle forecarriage according to claim 1, wherein the middle and side hinges are parallel to each other and are oriented so that, with respect to a projection plane passing through said middle hinges, the steering axes identify, with the axes of the middle hinge and side hinge, an angle said angle α being between 80 and 120 degrees and.

22. Motor vehicle forecarriage according to claim 1, wherein the hinges are parallel to each other and orthogonal to said steering axes so that, with respect to a projection plane passing through said middle hinges the steering axes identify with the axes of the middle hinge and side hinge, an angle of 90 degrees.

23. Motor vehicle forecarriage according to claim 1, wherein the steering axes, with respect to a projection plane passing through said middle hinges, are inclined by a steering angle between 4 and 20 degrees with respect to a vertical direction, perpendicular to the ground.

24. Motor vehicle forecarriage according to claim 1, wherein the middle and side hinges are inclined according to the axes of the middle hinge and side hinge parallel to the ground, i.e., perpendicular to a vertical direction perpendicular to the ground.

25. Motor vehicle forecarriage according to claim 1, wherein said middle hinges and side hinges are oriented according to the axes of the middle hinge and side hinge parallel to each other.

26. Motor vehicle having a drive wheel at the rear axle and a forecarriage according to claim 1.

27. Motor vehicle according to claim 26, wherein the motor vehicle comprises two rear drive wheels at the rear axle.

* * * * *